Figure 1:
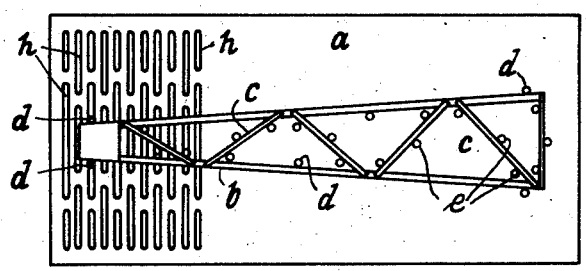

April 15, 1930.  H. SCHMUCKLER  1,755,031
WELDING TABLE
Filed Nov. 10, 1928

Inventor:
Hans Schmuckler
by Fuchs Ackerman
Atty

Patented Apr. 15, 1930

1,755,031

UNITED STATES PATENT OFFICE

HANS SCHMUCKLER, OF BERLIN, GERMANY

WELDING TABLE

Application filed November 10, 1928, Serial No. 318,512, and in Germany May 5, 1927.

The invention relates to means for the mass production of structural members of similar type which are intended to be formed from separate parts, such as girders, beams, stays, iron sections or the like by welding, and completing. Structural members of this kind such as lattice-work, masts, tie beams, girders and the like have hitherto been produced in the usual way by riveting, but this method of construction entails a relatively large amount of hand labour which increases the cost.

According to the present invention a substantial reduction in the cost of production of structural materials of similar type is effected by the employment of electrical or autogenous welding, the welding being employed to replace the hitherto usual riveting, in such places where welding offers economic advantages over riveting. These conditions exist particularly when the production of structural members of similar type is in question. The superiority of welding over riveting in respect of saving time and labour consists mainly in that, in the case of riveting, a considerable amount of work especially in drilling the rivet holes has to be done on the individual parts of the structural member. The drilling entails very careful marking out beforehand in order to prevent subsequent defects in the riveting. In the case of welding however, this considerable preliminary work is dispensed with, and all that is necessary is to assemble the parts correctly at the moment the welding is to be performed whereupon the union by welding can be effected without further trouble.

Hence, if the advantages of welding are to be fully utilized, there must be no binding the parts together by binding screws prior to welding, since that would result in the disappearance of the advantage afforded by welding in comparison with riveting. The welding together of the parts must therefore be effected without any preliminary work and on the other hand this must be done in such a manner that the parts fit together properly.

To enable this to be accomplished, according to the invention, a baseplate acting as a template must first be made on which the position of the structural member under consideration, such as the one half of a lattice-work mast, is marked, either direct or on a paper overlay. This baseplate is then fitted with stops of any kind, which are so located that at least two of them are adapted to hold a part, as for example, an iron section, in the marked position. When all the necessary stops have been attached to the baseplate, the production of the structural member can be effected in, as it were, a continuous manner by uniting the several parts. All that is necessary is to lay the suitably shaped parts on the template provided with the stops which latter hold each part in position. Hence two abutting parts lie in such a position that the welding joint is ready at once and the welding can proceed without any further preliminary work.

It is evident that this method of production fully utilizes the advantages afforded by welding in comparison with riveting because apart from trimming the various parts to shape, all preliminary work is dispensed with. This method of production can, of course, also be selected in the production of individual structural members and the larger the number of similar parts to be made the greater the advantage of this method of working.

The stops may be of various forms and may consist of spikes, screws or blocks, and these again may be secured to the template baseplate in various ways. A plate provided with guide slots may also be used.

Figure 2:
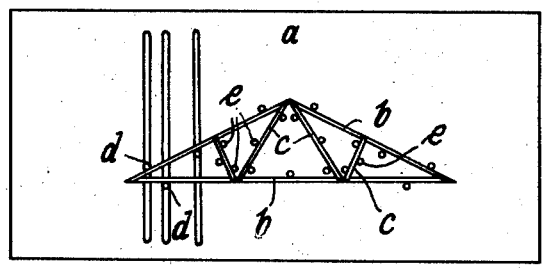
Figure 3:
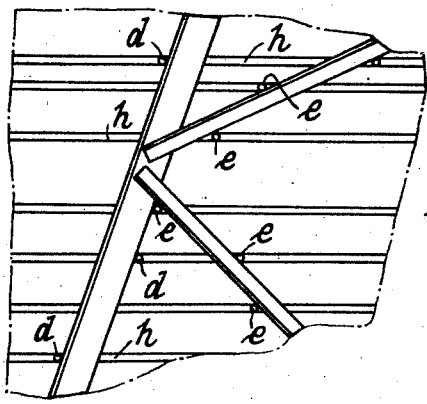

Several embodiments of the baseplate are illustrated in the drawings. Figure 1 shews the baseplate supporting a lattice-work mast, Figure 2 with a roof principal and Figures 3 and 4 shew details of the baseplate on a larger scale.

The articles to be produced, for example, a lattice-work mast (Figure 1), roof principal (Figure 2) or other structures, are marked out full size on the baseplate $a$, serving as a template, or, on occasion, on a piece of drawing paper laid thereon. The various parts of the structure such as girders $b$, stays $c$ or the like, are then secured on the baseplate by means of stops $d$, $e$, blocks $f$, $g$, or the like in such a manner that for a large number of similar structures to be made the corresponding stays or the like are always laid between said stops or are secured by means of the blocks in order to be held in their proper position for assembling, whereupon they can be welded without any holes having to be drilled in the same. In the case, for example, of a wooden baseplate, the stops $d$, $e$ or blocks $f$, $g$ may be provided with fastening means (for example, conical) suitable for each article to be produced. After the device has been used for a given article, the holes can be filled up, for example with wooden spiles, or left open for subsequent use.

Figure 4:
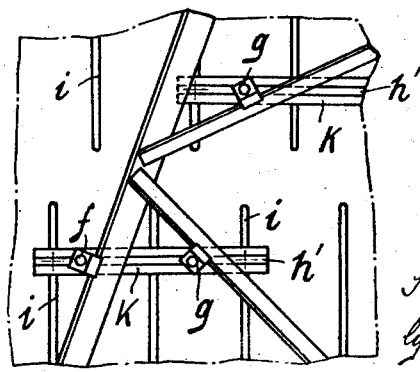

In the case of an iron baseplate on the other hand, it is advisable to provide slots $h$ at suitable intervals beforehand in which the stops $d$, $e$ or securing screws of the blocks $f$, $g$ can be shifted so that any desired construction can easily be secured. It is immaterial whether the slots $h$ are cut directly in the baseplate (Figure 3) or slides $k$, provided with the slots $h'$, are displaceably mounted on the baseplate (Figure 4). In the drawings, the slides move, for example in slots $i$ in the plate.

In this manner, all that is needed is to trim all the rods required for a welded structure to the proper length, and to assemble and weld them together to form the desired structure without any other treatment such as drilling holes or temporary bolting together.

What I claim is:—

1. A welding table consisting of a flat surface having transversely spaced apart parallel slots and beyond the slots a plurality of apertures, and means for holding a plurality of bars in abutting engagement with each other, whereby said bars may be joined by welding to constitute a frame.

2. A welding table comprising a flat metallic table top having slots, removable and adjustable means for detachable engagement with the slots, said means associating structural units with the table and with each other, whereby the overlying members of a unit may be positioned and held in engagement to be associated by welding.

3. The combination with a welding table having a plurality of parallel slots therethrough, displaceable means for adjustably connecting longitudinally grooved bars to the surface of the table, clamps adjustable in the grooves of the bars, substantially as shown, whereby structural units may be held in position for welding upon the surface of the table.

In testimony whereof he affixes his signature.

HANS SCHMUCKLER.